Nov. 24, 1970 M. BOUYER 3,542,568

PROCESS FOR PACKAGING AND STERILIZATION OF BREAD

Filed April 29, 1968 2 Sheets-Sheet 1

INVENTOR
MICHEL BOUYER

BY *Sherman & Shalloway*
ATTORNEY

United States Patent Office 3,542,568
Patented Nov. 24, 1970

3,542,568
**PROCESS FOR PACKAGING AND
STERILIZATION OF BREAD**
Michel Bouyer, Le Vesinet, France, assignor to La Cellophane Société Anonyme, Paris, France, a corporation of France
Filed Apr. 29, 1968, Ser. No. 724,797
Claims priority, application France, June 12, 1967, 109,911
Int. Cl. B65b 25/18
U.S. Cl. 99—173          7 Claims

ABSTRACT OF THE DISCLOSURE

A process for the continuous packaging and sterilization of hygroscopic food products, e.g. bread, wherein the products to be packaged are disposed in a spaced relationship in a tube of thermosealable plastic, such tube of thermosealable plastic with such food product disposed therein passing through a sterilization station at the outlet of which the tube is sealed between the individual food products. Prior to passage through the sterilization station, the thermosealable plastic is provided with individual units of hygroscopic food product by means of a transverse seal that furnishes a communicating passage between the units.

---

Figure 1:
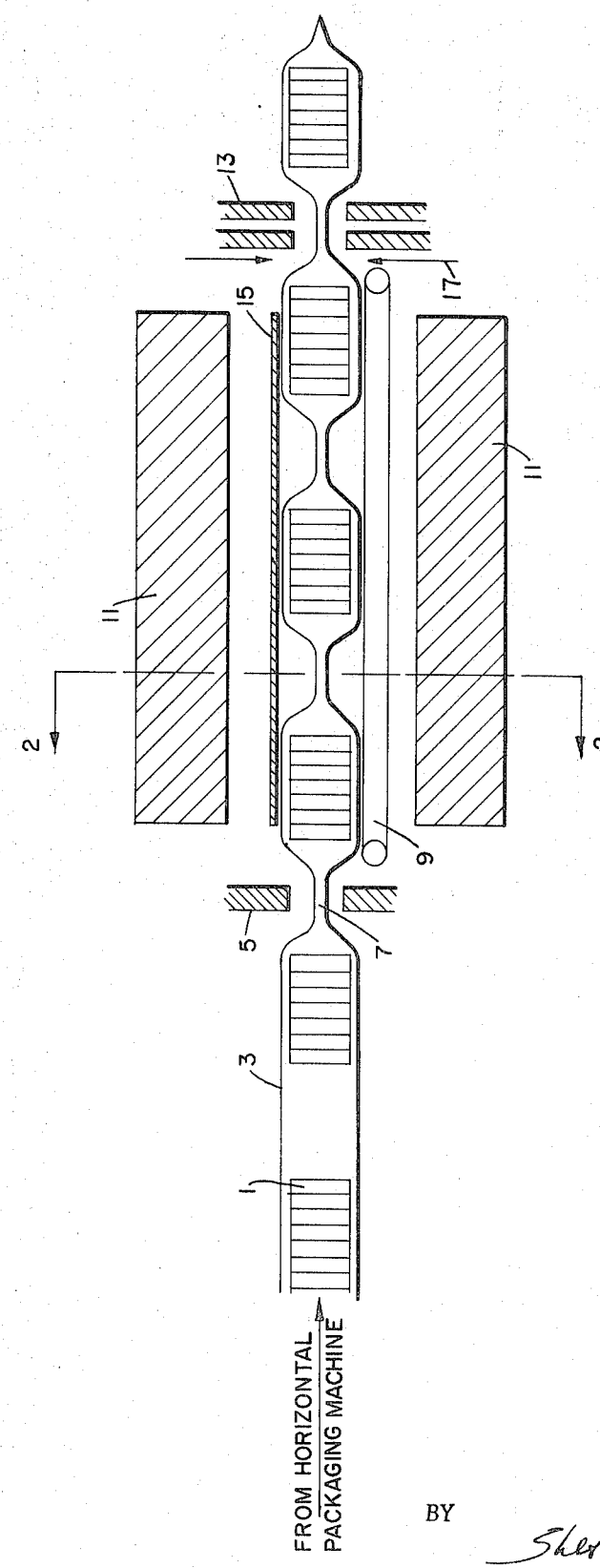

The present invention is directed to a novel method of packaging hygroscopic food products, and more particularly, to a continuous packaging and sterilization of hygroscopic food products, particularly bread.

In this respect, the present invention is directed to a method of packaging food products which is not only intended to protect them from dust and to afford a convenient and attractive display, but also, and more importantly, to extend the period during which such food products will remain edible.

It has been previously proposed that the roll of packaging of food products can be extended so as to contribute to the effectiveness of various treatments which improve certain qualities of the packaged products. Thus, for example, it has been previously proposed that the sterilization of food products in a sealed package through the effect of heat can be utilized. Such a sterilization of food products in a sealed package through the effect of heat allows for a substantial increase in the preservation of the food products, protecting them simultaneously against humidity and air oxidation and preventing the formation of molds. Such a process, however, is not without limitations.

Thus, the use of such a sterilization of food products in a sealed package is ineffective in those cases wherein the food product contains air and water vapor since these substances expand in the course of the sterilization from heat and tend to burst the package. Accordingly, a wide variety of hygroscopic food products and other food products cannot be sterilized by previously employed processes wherein such sterilization has been carried out by the use of heat, the food product being within a sealed package.

With respect to such hygroscopic products and similar products, e.g. bread, sterilization has generally been carried out after an opening has been made in a package of air-tight material. In this way, air and steam contained in the package may escape through such opening in the course of the sterilization treatment, and the package can be subsequently closed, e.g. as through the use of an adhesive patch. Utilizing such a sterilization procedure, it is generally recognized that bread can be preserved for about nine days.

Such preservation time, however, could be prolonged very substantially if a means were found whereby it were possible at the end of the sterilization treatment to avoid any possible entrance of contaminated air that could initiate the formation of mold and otherwise deteriorate the food product. Accordingly, while the procedure previously utilized for the sterilization of bread and similar food products has provided a limited amount of preservation, such procedure has not been as effective as possibly desired, since contaminated air inevitably enters the food product between the time of sterilization and the employment of a closure means to seal up the hole produced in the packaging material.

Various attempts to eliminate the deficiencies of a process such as defined above have not been successful and have not been found commercially practical. In this respect, while various means have been sought whereby products such as bread would not lose water in the course of the sterilization treatment, such attempts have not been found satisfactory in that an equivalent food product cannot be produced since the evaporation that occurs in the opening made in the package during the conventional sterilization treatments modifies the composition within the package so as to produce the desired food product. Similarly, attempts and proposals made to effect the closure of the open food package within a sterile environment have been found unsatisfactory both from the standpoint that such proposals presuppose the existence of a large plant, and generally only apply to the treatment of separate packages, thereby eliminating the continuous nature of the packaging and sterilization process.

Accordingly, it has long been a desire of the industry to provide an effective process for the continuous packaging and sterilization of food products, particularly certain hygroscopic and similar products, e.g. bread, which process would eliminate the inherent deficiencies of previously employed processes.

This has been accomplished in accordance with the present invention wherein such disadvantages and drawbacks of prior art processes have been eliminated by providing a continuous process for the packaging and sterilization of hygroscopic food products in a sealed package, such process being one wherein the food products are disposed as space units in a tube of thermosealable plastic, the entire assembly passing through a sterilization station. Such process allows for the continuous packaging and sterilization of the hygroscopic food product without puffing of the package material and without the need for supplementary, cumbersome equipment. In accordance with the process of the present invention, it is possible to insure a more thorough sterilization of the food product and an accordingly longer period of conservation thereof.

Accordingly, it is the principal object of the present invention to provide a continuous process for the packaging and sterilization of food products, which process eliminates the inherent deficiencies and disadvantages of previously employed processes.

A further object of the present invention is to provide a novel process for the packaging and sterilization of certain hygroscopic food products, e.g. bread, wherein a more thorough sterilization allowing for an accordingly longer period of conservation is provided.

A still further process of the present invention comprises a continuous process for the packaging and sterilization of certain hydroscopic food products, e.g. bread, such process being characterized by the fact that such food products to be packaged are disposed as space units in a tube of thermosealable plastic, the entire assembly including spaced food products passing through a sterilization station at the outlet of which the tube is sealed crosswise between the respective units.

Yet a further object of the present invention is to provide such a novel continuous process for the packaging and sterilization of hydroscopic food products wherein such individual units are positioned in the tube of thermosealable plastic by means of transverse seals that furnish communicating passages between the individual units.

Still further objects and advantages of the process of the present invention will become more apparent in the following more detailed description thereof.

The above objects and advantages of the novel process of the present invention are achieved by the utilization of a continuous packaging and sterilization of food products, particularly hydroscopic food products, e.g. bread, wherein the products to be packaged are disposed as spaced units within a tube of thermosealable plastic, the entire assembly passing through a sterilization station at the outlet of which the tube of thermosealable plastic is sealed crosswise between the respective units.

The process of the present invention is not dependant upon the use of any particular type of sterilization through the package of food product, any suitable sterilization process being applicable. Preferably, high frequency currents are employed during the sterilization within the sterilization station through which the tube of thermosealable plastic passes, since such use of high frequency current makes it possible to reach high temperatures at the interior of the product very rapidly. Using bread as an example, a temperature within the heart of the bread of 80° C. can be readily obtained in less than 10 seconds. Such a temperature is sufficient to insure effective sterilization of the bread. Of course, with different food products, it may be advantageous to employ different temperatures of sterilization and, in fact, different sterilization means. In this respect, it is again pointed out that the process of the present invention is not dependant on the employment of any particular means of sterilization, the use of high frequency currents being preferred as the most advantageous and efficient sterilization means known to date. The sterilization system or unit is generally provided in the form of a tunnel through which the product to be sterilized passes in spaced relationship within a heat sealable plastic. The size and dimensions of such tunnel, of course, vary in accordance with the rate of travel of the food products through the tunnel, the temperature of sterilization, and the desired yield of sterilized product. In this respect, it suffices to say that the tunnel must be of sufficient length so as to insure the desired degree of sterilization under the conditions of sterilization chosen. Accordingly, there is great latitude in choosing the operable parameters of sterilization conditions and the type of sterilization unit employed in accordance with the process of the present invention.

In accordance with the process of the present invention, the product to be sterilized is passed through such sterilization system, e.g. sterilization tunnel, in a tube of heat sealable plastic, the product to be sterilized being spaced at regular intervals within the tube. The production of the tube of thermosealable plastic containing the food product at spaced intervals can be provided by the use of any conventional packaging machine. Preferably, a conventional, horizontal type packaging machine is utilized starting with a thermoplastic material in a web and forming the same into a tube in a known manner. Thus, for example, the web of packaging material may be bent over around the food product, e.g. bread, to be packaged so that the bent-over edges overlap below the products, such edges being welded longitudinally and continuously by passage of a thermoplastic material over a heating element. Such horizontal type packaging machines are well known in the prior art.

As noted previously, the individual food elements or food products are generally provided at regularly spaced intervals within the tube of thermosealable plastic. Such regularity is provided for the purpose of improving the appearance of the food products as by causing them to coincide with printed elements preliminarily supplied on the web of thermosealable plastic, as well as to provide a more ready and uniform means of accomplishing the continuous packaging and sterilization of the food product. To provide such regularity of the spacing of the food units within the tube of thermosealable plastic, it is advantageous to position them by means of two partial transverse seals, provided without cutting, such seals being made with care to leave a communicating passage between the individual units.

In accordance with the process of the present invention, any suitable packaging material may be utilized. The only requirements of such material are that such materials must be airtight and heat sealable, at least on that face that is turned toward the product to be packaged. Accordingly, any of the conventional packaging thermoplastic or heat sealable materials can be utilized. These include, for example, regenerated cellulose films provided with a thermosealable coating, polyolefin films, e.g. polyethylene polypropylene, polymerized vinylhalides, e.g. polyvinyl chloride, polyvinylidene chloride, etc., as well as these and similar materials and copolymers of such thermoplastic materials.

Advantageously, a combined material is utilized comprising at least two films so that the advantages of each can be combined in the production of the packaged and sterilized product. An advantageous and preferred material, for example, can comprise a complex comprising a regenerated cellulose film and a polyethylene film.

In accordance with one embodiment of the present invention, it has been found that when packaging and sterilizing certain food products, particularly bread, it is advantageous to limit the dimension of the communicating passage made between two adjacent units prior to sterilization, particularly when the sterilization is effected by high frequency or ultra high frequency radiation. In this respect, it has been observed that if the communicating passage that is provided is too large, the steam that accumulates in a larger amount in the interior of the bread than at its periphery and in the zone between bread and package, heats faster in this region and upon sterilization it immediately escapes from the downstream unit toward the upstream unit so that the bread does not have time to heat up properly at the surface. The result, therefore, is a sterilization that is not sufficiently homogeneous.

In addition, when too large an opening is left between units, too great an amount of air and steam escapes at the outlet of the high frequency sterilization tunnel and the lowering of air pressure that is produced upon cooling induces an exaggerated contraction of the package that is evidenced by an unpleasing appearance.

It has been found in accordance with this embodiment of the present invention that the above drawbacks associated with the employment of the communicating passage which is too large can be completely eliminated by providing a communicating package of very small dimensions as a traverse seal between the individual food elements positioned within the tube of thermosealable plastic. When such a small passage is provided, a portion of the air and steam heated by the sterilization treatment remains inside the package which is brought to a more uniform temperature at its interior. This, accordingly, improves the conditions of sterilization as well as the appearance of the package after cooling.

While the reduction of the dimensions of the communicating or evacuation passage may entail slight puffing of the individual packages during the sterilization process, the sides of such passage can be adjusted as a function of the nature of the package material and the behavior of the package product so that the inflation or puffing will not be such as to cause bursting of the package during the process of the present invention. For soft bread, for example, having a square section of about 10 cm. to the side, the width of the communicating passage that should be established to fulfill the objects of the processes of the present invention is in the order of about a millimeter.

Alternatively, all communication between the individual units can be eliminated by the employment of a tight seal produced before sterilization. Such employment of a tight seal between adjacent units or packages is especially useful if the air and water vapor content of the product and the nature of the material used for packaging are such that the high frequency sterilization treatment could not have the effect of bursting the package.

In addition, it is alternatively possible to arrange the high frequency radiation treatment tunnel so as to prevent possible bursting of the food packages through puffing. This can be easily done, for example, by arranging an auxiliary tunnel inside the high frequency tunnel, such auxiliary tunnel having a similar configuration as the high frequency tunnel, the size of said auxiliary tunnel being slightly greater than that of the products to be packaged. Of course, the size of such auxiliary tunnel must be less than the size of the critically inflated packages. Such an auxiliary tunnel which is not required to withstand temperatures about 100° C. can be made of any suitable material which will not block the high frequency radiations. Of course, it is advantageous to provide a smooth and sufficiently slippery surface so as not to break the travel of the packaged products in a state of internal inflation.

Such an auxiliary tunnel can be made, for example, of glass or rigid plastic material that is capable of withstanding a temperature of 100° C. or more without deformation. A great number of plastic materials are suitable for this purpose. Among these can be mentioned, for example, polymethylmethacrylate, high density polyethylene, and many others. The slipperiness of the auxiliary tunnels can be enhanced if necessary by the employment of a silicone base coating or a coating of polytetrachloroethylene or any other suitable resin having lubricating properties.

In accordance with the process of the present invention, in order to finish the sterilization and packaging of the food product a sealing and cutting system is established at the outlet of the sterilization tunnel at a distance suitable for sufficient cooling. Such a sealing and cutting system seals the tube crosswise and separates each package unit. Of course, the distance of the sealing and cutting unit from the outlet of the sterilization tunnel depends upon the temperature of sterilization, the rate of travel of the food material through the sterilization unit, as well as the possible utilization of artificial cooling means. Similarly, the distance between the sealing and cutting system and the outlet of the sterilization tunnel depends upon the nature of the food product to be preserved and the form of package utilized.

With respect to the cooling of the sterilized food product, it is possible to allow the product to cool merely by allowing the food product to exit the sterilization tunnel and pass into the ambient air for a sufficient period of time, or cool air can be passed upon the food product so as to cool the same more rapidly.

In accordance with the process of the present invention the air and steam that are expanded in the course of sterilization can only expand freely upstream in the sterilization tunnel, that is, the air and steam can only expand ahead of the sterilization. Accordingly, no contaminated air and no inflation can occur in the package once sterilization has been effected. In addition, the circulation of air and steam within the sterilization tunnel tends to act as a closed circuit or system creating a balanced circulation of water and retention of water in the food product. Accordingly, this allows for a more even control of the water content of such food product, e.g. bread.

The process of the present invention will now be described by reference to the following specific example. It is to be understood, however, that such example is presented for purposes of illustration only, and the present invention is in no way to be deemed as limited thereby.

EXAMPLE

Figure 2:
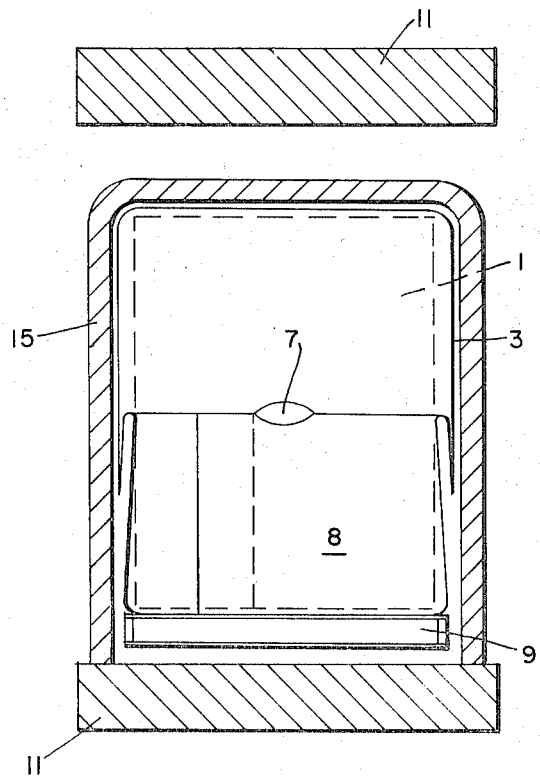

The process of the present invention was carried out for the sterilization and packaging of a loaf of bread by the various operations shown in section schematically in FIG. 1. FIG. 2 shows in section a loaf of bread along line 2—2 in the course of sterilization in a package such as provided in accordance with the process of the present invention.

The product to be packaged, i.e., a presliced parallelepipedal loaf 1, is brought into a conventional horizontal packaging machine (not shown) where the bread is packaged in a continuous web composed of a combination of cellulose and polyethylene film formed into a tube 3 after being folded under and sealed by welding.

A transverse sealing device 5, comprising jaws of which a reciprocating motion is imparted as controlled by a photoelectric cell, (not shown) thereby only bringing such jaws into contact when no loaf is passing between them, is positioned at the output of the packaging machine. According to the embodiment illustrated here, the jaws are partially recessed so as to come into contact only along a part of their width, thereby establishing a passage 7 between two adjacent packages, between welds 8.

The loaves thus prepackaged as units are then conveyed by the endless belt 9 through the high frequency tunnel furnace 11 at about 80° C., the loaves of bread passing through the tunnel in about 10 seconds. They move through the tunnel inside auxiliary tunnel 15 which is made of high density polyethylene and whose section is adapted at the upper part and at the sides to the configuration of the prepackaged loaves, to allow only a very small space for the puffing of the package, excess air and steam being driven off in the course of sterilization through the passage 7 toward the adjacent unit upstream.

Thus, by the use of this process, the sterilization of the bread is accomplished without the entrance of any contaminated air which could cause degradation of the sterilized food product. The air and steam that are driven off during the course of the sterilization in passing upstream through the tube of thermosealable plastic tend to act as a closed circuit, thereby creating a balanced water content in the sterilized product. In this example, the communicating passage employed in the sterilization of the bread was approximately 1 mm. in diameter.

At the outlet, after passage in free air that is sufficient for cooling, each packaged unit is finished by a cutting and sealing device schematically shown as 13.

Alternatively, as shown in FIG. 1, the package leaving the sterilization tunnel can be cooled by the introduction of forced air conveyed as illustrated through line 17.

As stated previously, the process of the present invention allows for the sterilization and packaging of food products, particularly hygroscopic food products in a manner and by a process which insures a more thorough sterilization and a longer period of conservation of the food product. This is accomplished in accordance with the present invention without the need for supplementary, cumbersome equipment. Thus, wherein conventional processes for packaging food and similar products has allowed preservation for about 9 days, considerably longer periods of conservation can be accomplished in accordance with the process of the present invention.

While the process of the present invention has been described primarily with respect to the foregoing specific example, it is to be understood that the present invention is in no way to be deemed as limited thereto but should be construed as broadly as all or any equivalents thereof.

I claim:

1. A process for the continuous sterilization of packaged hygroscopic products comprising passing said products, disposed in spaced relationship in a tube of thermosealable plastic, through a sterilization tunnel so as to affect the sterilization of said products and subsequently sealing said tube of thermosealable plastic between adjacent hygroscopic products, said process being characterized in that adjacent hygroscopic products are disposed in said tube of thermosealable plastic between restrictions in said tube which provide a small communicating passage between adjacent hygroscopic products.

2. The process of claim 1 wherein said hygroscopic products comprise food products.

3. The process of claim 2 wherein said food products comprise loaves of bread.

4. The process of claim 2 wherein said sterilization is conducted in said sterilization tunnel by a high frequency current.

5. The process of claim 2 wherein said tube of thermosealable plastic passes through an auxiliary tunnel within said sterilization tunnel, said auxiliary tunnel being of such a size as to prevent bursting of said packaged hygroscopic products during sterilization.

6. The process of claim 2 wherein said hygroscopic food products are cooled prior to sealing said tube of thermosealable plastic.

7. The continuous sterilized and packed hygroscopic products produced by the process of claim 1.

References Cited

UNITED STATES PATENTS

| | | | |
|---|---|---|---|
| 2,105,648 | 1/1938 | Haas | 99—172 |
| 2,185,469 | 1/1940 | MacDonald | 99—172 X |
| 2,813,799 | 11/1957 | Bender et al. | |
| 3,052,559 | 9/1962 | Peebles. | |
| 3,090,174 | 5/1963 | Kraft. | |
| 3,108,881 | 10/1963 | Shaw et al. | 99—171 |
| 3,261,140 | 7/1966 | Long et al. | 99—214 X |
| 3,388,789 | 6/1968 | Simandl et al. | |
| 3,427,171 | 2/1969 | Jeppson | 99—221 |

FOREIGN PATENTS 832,076    4/1960    Great Britain.

OTHER REFERENCES

Olsen: Microwaves Inhibit Bread Mold, "Food Engineering," July 1965, pps. 51–53, 99–173.

Cathcart et al.: The Treatment of Packaged Bread . . ., "Food Technology," I, #2, pps. 174–177, 99–172.

TIM R. MILES, Primary Examiner

U.S. Cl. X.R.

99—221